United States Patent [19]

Smith

[11] Patent Number: 5,682,445
[45] Date of Patent: Oct. 28, 1997

[54] STRAIN BASED OPTICAL FIBER DEVICES

[75] Inventor: Ronald H. Smith, Chevy Chase, Md.

[73] Assignee: Optelecom, Inc., Gaithersburg, Md.

[21] Appl. No.: 621,967

[22] Filed: Mar. 26, 1996

Related U.S. Application Data

[63] Continuation-in-part of Ser. No. 370,245, Jan. 9, 1995, Pat. No. 5,502,782.

[51] Int. Cl.$^6$ ..................................... G02F 1/335
[52] U.S. Cl. .................. 385/7; 385/1; 385/4; 385/10
[58] Field of Search ................. 385/7, 1, 4, 10, 385/27

[56] References Cited

U.S. PATENT DOCUMENTS

| | | | |
|---|---|---|---|
| 3,858,437 | 1/1975 | Jarzynski et al. | 73/67.5 |
| 4,068,191 | 1/1978 | Zemon et al. | 331/94.5 |
| 4,328,569 | 5/1982 | Troit et al. | 367/103 |
| 4,477,723 | 10/1984 | Carome et al. | 250/227 |
| 4,753,507 | 6/1988 | De Paula et al. | 350/96.15 |
| 4,793,676 | 12/1988 | Risk | 385/4 |
| 4,872,738 | 10/1989 | Risk et al. | 385/1 |
| 4,907,856 | 3/1990 | Hickernell | 350/96.29 |
| 4,991,923 | 2/1991 | Kino et al. | 350/96.15 |
| 4,996,692 | 2/1991 | Kabacoff | 372/26 |
| 5,002,349 | 3/1991 | Cheung et al. | 385/1 |
| 5,054,873 | 10/1991 | Davis et al. | 385/27 |
| 5,119,447 | 6/1992 | Trisno | 385/3 |
| 5,159,601 | 10/1992 | Huber | 372/6 |
| 5,191,586 | 3/1993 | Huber | 372/6 |
| 5,400,171 | 3/1995 | Song | 385/7 |
| 5,502,782 | 3/1996 | Smith | 385/7 |

OTHER PUBLICATIONS

High–Performance Optical Analog Link Using External Modulator, G.E. Betts et al, IEEE Photonics Technology Letters, vol. 1, No. 11, Nov. 1989, pp. 404–406.

Growth of Bragg Gratings Produced By Continuous–Wave Ultraviolet Light In Optical Fiber, H. Patrick & S. L. Gilbert Optics Letters, vol. 18, No. 18, Sep. 15, 1993.

New Design Concept for a Narrowband Wavelength–Selective Optical Tap and Combiner, Electronic Letters, vol. 23, pp. 668–669, by D.C. Johnson et al, Apr. 1987.

*Primary Examiner*—Phan T. H. Palmer
*Attorney, Agent, or Firm*—William L. Feeney; Kerkam, Stowell, Kondracki & Clarke, P.C.

[57] ABSTRACT

Optical fiber devices include optical fibers having grating portions with in-fiber gratings having optical characteristics which are changed by the use of strain inducing members. The strain inducing members are connected to optical fibers in such a way that the strain applied to an in-fiber grating in an optical fiber is greater than the strain in the strain inducing members. Basically, a given percentage change in a dimension of one of the strain inducing members causes a greater percentage change in a dimension of the grating portion. The strain inducing members may apply lengthwise or radial strain to the grating portion. Arrangements with mechanical coupling of two fibers using one or more strain inducing members are useful for producing equal strain in grating portions of two fibers for interferometer configurations or other applications. The strain inducing members can be acoustic wave transducers, piezoelectric transducers, pneumatic actuators, hydraulic actuators, members inducing strain due to heat induced dimension change, members inducing strain due to cooling induced dimension change, and motor controlled dimension changing structures. An arrangement using two different types of these strain inducing members provides for different response time delays for implementing changes in strain and provides reduced steady state power consumption. A feedback circuit using a strain gauge provides the ability to adjust and maintain strain (and corresponding optical characteristics) of an in-fiber grating at a desired value.

35 Claims, 4 Drawing Sheets

STRAIN BASED OPTICAL FIBER DEVICES

The present application is a continuation-in-part (CIP) application based on the present inventor's U.S. application entitled FOCUSED ACOUSTIC WAVE FIBER OPTIC REFLECTION MODULATOR, Ser. No. 08/370,245, filed Jan. 9, 1995, which will issue Mar. 26, 1996 as U.S. Pat. No. 5,502,782. Another U.S. Ser. No. 08/622,019 CIP application based on that application is being filed Mar. 26, 1996 concurrently herewith in the name of the present inventor and entitled STRAIN BASED OPTICAL FIBER SYSTEMS. Those two applications are both assigned to the assignee of the present application and are hereby incorporated by reference.

BACKGROUND OF THE INVENTION

The present invention relates to optical fiber devices in which strain is applied to change the optical path of a region of an optical fiber having an in-fiber grating therein. More specifically, the present invention relates to such devices having a high figure of merit. The present invention further relates to such devices where an optical path length change is induced by a steady strain (as opposed to transient strain).

The present inventor's above referenced application Ser. No. 08/370,245 now U.S. Pat. No. 5,502,782 shows a device configuration which produces an optical path length change through the action of transient strain induced by an acoustic wave passing through the fiber core. The changes in optical path length occur in a grating portion of an optical fiber, which portion houses an in-fiber grating. The changes in optical path lengths modify the spectrum characteristics of the in-fiber gratings and are used in constructing modulators, interferometers, transceivers, optical switches, drop/insert devices (which drop one or more optical signals and add one or more optical signals), and optical fiber networks. (No admission is made herein that the application Ser. No. 08/370,245 now U.S. Pat. No. 5,502,782 is prior art to the present application.)

Although the inducement of strain in optical fibers with in-fiber gratings has been accomplished by various techniques, the figures of merit provided by these techniques have generally been quite limited. (The figure of merit will be understood as representative of the amount of change in optical characteristics of an optical fiber device.) The limits on the various strain inducing techniques have in turn limited the amount of change which can be produced in the optical characteristics of in-fiber gratings.

The use of inducement of strain in optical fibers with in-fiber gratings has often been limited in the type of strain which can be produced and, therefore, the resulting changes in optical characteristics (such as reflection spectrum) have been limited.

The use of inducement of strain in optical fibers with in-fiber gratings has often lacked flexibility and adaptability in the types of mechanisms used for inducing the strain.

The use of inducement of steady state strain (i.e., more than simply momentary or transient strain) in optical fibers with in-fiber gratings generally requires relatively high power consumption to maintain the strain and corresponding optical characteristics.

In various optical devices it is useful to induce an equal strain (and corresponding equal change in optical characteristics) in two different in-fiber gratings within two different optical fibers. A precise and relatively simple way of inducing equal strain would be quite useful.

The inability to precisely control the strain and the corresponding optical characteristics of one or more in-fiber gratings under varying conditions (such as changes in ambient pressure and temperature) has limited uses of various optical devices using in-fiber gratings.

OBJECTS AND SUMMARY OF THE INVENTION

Accordingly, it is a primary object of the present invention to provide new and improved optical fiber devices.

A more specific object of the present invention is to provide an optical fiber device with an improved figure of merit for strain-induced changes in optical characteristics of an optical fiber having an in-fiber grating.

A further object of the invention to provide an improved optical fiber signal switch.

Another object of the invention is to provide a wide tuning range for optical fiber signal switch wavelengths.

Another object of the invention is to minimize the interval of time between electronic switching signal input and optical switching response of optical fiber signal switches.

Another object of the invention is to provide a wide range of switched-state duration times in any selected switch state, including leaving a switch in a selected state indefinitely.

A further object of the present invention is to provide optical fiber devices with great flexibility and adaptability in the techniques used for inducing strain and in the type of strain produced.

Yet another object of the present invention is to provide optical fiber devices with the ability to produce steady state strain and corresponding optical characteristics with reduced steady state power consumption.

A further object of the present invention is to provide a precise and relatively simple way of inducing equal strain in different optical fibers.

Yet another object of the present invention is to provide for precise control and stability of the strain and the corresponding optical characteristics of one or more in-fiber gratings under varying conditions.

Yet another object of the present invention is to provide for combining various strain inducing techniques including tension members and compression members to provide an improved or expanded in-fiber grating spectrum tuning range.

A still further object of the present invention is to provide for combining various strain inducing techniques including thermal expansion, thermal contraction, mechanical leverage, piezoelectric action, pressurized fluid (hydraulic or pneumatic) cylinders or members, and motor control.

The invention provides an optical fiber or equivalent light guiding medium having a reflection grating at the light guiding core; the reflection spectrum of the in-fiber grating is modified by the strain imposed by novel means on the section of optical fiber containing the grating.

A quasi-static phase modulator as described by Jarzynski, op. cit., may be improved by recent advances in piezoelectric materials to the point where an in-fiber grating can be strained to the degree necessary for effective wavelength selective optical switching. Quasi-static operation is extendable to long-term static operation of an optical switch by means of tailored piezoelectric drive waveforms. Full permanence of the switched state can be achieved by augmenting piezoelectric strain-generating mechanisms with thermal and/or mechanical strain mechanisms.

Attaching one end of an optical fiber in-fiber grating section to the base of a first linear support structure disposed parallel to the fiber and attaching the other end of the optical fiber in-fiber grating section to the end of a second linear support structure disposed parallel to the fiber and connecting the first and second support structures at a point opposite the point where in-fiber grating is connected to the base of the first linear support structure provides a means of straining the in-fiber grating section of optical fiber by more than the strain of either the first linear support structure or the second linear support structure. Increased strain in the in-fiber grating section of optical fiber results in increased tuning range of an optical fiber switch using the in-fiber grating.

Concentration of the forces acting on an optical fiber core region can be achieved by reducing the diameter of lower refractive index waveguide cladding around the core as described, for example, in U.S. Pat. No. 4,468,091, titled "Fiber Optic Energy Sensor and Demodulation System and Method of Making Same," by Donald Schmadel and William Culver. Concentration of the forces acting on an optical fiber core region can also be achieved by imposing force by an intermediate structure on an optical fiber within an area small compared to an area within which the intermediate structure is subject to a primary driving force. Concentration of force in the optical fiber core region can increase strain in an in-fiber grating section of the fiber and thereby increase the tuning range of an optical fiber switch using the in-fiber grating.

Providing identical strain-based optical fiber switches in the two arms of a Mach-Zehnder fiber interferometer creates a Michelson fiber interferometer at the wavelength to which the in-fiber gratings are tuned. This Michelson fiber interferometer can be adjusted to reflect virtually all of the optical signal at a selected wavelength incident via one fiber connected to a first directional coupler of the Michelson fiber interferometer back through the directional coupler and out the second fiber connected to the directional coupler. This arrangement produces a wavelength selective optical tap. A second Michelson fiber interferometer exists which is formed by the in-fiber gratings and the second directional coupler of a Mach-Zehnder fiber interferometer. This Michelson fiber interferometer provides a path for inserting optical signals at the selected in-fiber grating wavelength. Either of the two Michelson fiber interferometers can convey bidirectional signals at a selected wavelength into and out of an optical fiber transmission line connected to the Mach-Zehnder fiber interferometer.

Additional objects and features of the invention will be apparent from the following description in which the preferred embodiments are set forth in detail in conjunction with the accompanying drawings.

The above and other features of the present invention, which will be more readily understood when the following detailed description is considered in conjunction with the accompanying drawings, are realized by an optical fiber device including a first optical fiber and an in-fiber grating in a grating portion of the first optical fiber. A first strain inducing member is operably connected to the first optical fiber and has an applicator end for applying strain to the first optical fiber and a remote end opposite the applicator end. A second strain inducing member is operably connected to the first optical fiber and has an applicator end for applying strain to the first optical fiber and a remote end opposite the applicator end. A strain controller is operable to change a dimension of at least one of the first and second strain inducing members, thereby moving the applicator ends of the first and second strain inducing members in different directions such that strain is applied to the in-fiber grating to change a first optical path length of the in-fiber grating. The first and second strain inducing members are connected to the first optical fiber such that, at any given time, the strain applied to the grating portion is greater than the strain in both of the first and second strain inducing members.

(As used herein, strain will mean the change in dimension per unit of dimension. More specifically, the preferred embodiments of the present invention as disclosed below have strain which will be understood as a change in linear dimension, such as length or width, per unit of linear dimension.)

Preferably, the first and second strain inducing members are connected to the first optical fiber such that, at any given time, the strain applied to the grating portion is greater than double the greater of the strains in the first and second strain inducing members. More preferably, the first and second strain inducing members are connected to the first optical fiber such that, at any given time, the strain applied to the grating portion is greater than ten times the greater of the strains in the first and second strain inducing members.

The first optical fiber has first and second regions on opposite ends of the grating portion.

In a lengthwise strain embodiment of the present invention, each of the first and second strain inducing members extend in a lengthwise direction along the length of the first optical fiber and the strain controller is operable to place a lengthwise strain on at least one of the first and second strain inducing members. In this embodiment, the first and second strain inducing members are operable responsive to the strain controller to place a greater lengthwise strain on the grating portion than the greater of the lengthwise strains on at least one of the first and second strain inducing members.

Two types of the lengthwise strain device are disclosed. In a first, the applicator end of the first strain inducing member is fixed relative to the first region, the applicator end of the second strain inducing member is fixed relative to the second region, the remote end of the first strain inducing member is fixed relative to the remote end of the second strain inducing member, and each of individual lengths of the first and second strain inducing members is greater than a length of the grating portion. The second lengthwise strain device includes a third strain inducing member operably connected to the first optical fiber and having an applicator end for applying strain to the first optical fiber and a remote end opposite the applicator end, the third strain inducing member extending in a lengthwise direction along the length of the first optical fiber. In this device, the strain controller is operable to place a lengthwise strain on all of the first, second, and third strain inducing members, the first, second, and third strain inducing members being operable responsive thereto to place a greater lengthwise strain on the grating portion than the strain on each of the first, second, and third strain inducing members. The applicator end of the first strain inducing member is fixed relative to the first region, the applicator end of the third strain inducing member is fixed relative to the second region, the remote end of the first strain inducing member is fixed relative to the remote end of the second strain inducing member, and the applicator end of the second strain inducing member is fixed relative to the remote end of the third strain inducing member. The connection of the applicator end of the second strain inducing member to the optical fiber is by way of the third strain inducing member. Each of individual lengths of the first, second, and third strain inducing members is greater than a length of the grating portion.

A radial strain embodiment has the strain controller induce radial strain in the in-fiber grating. Each of the first and second strain inducing members are connected to the first optical fiber by way of corresponding first and second strain increaser members, each having a relatively large outer surface area to which the corresponding strain inducing member applies strain and a relatively small inner surface area operably connected to transmit strain to the in-fiber grating. A strain gauge is operably connected to at least one of the first strain inducing member and the second strain inducing member for measuring the strain thereof. A feedback loop connects the strain gauge to the strain controller such that the strain controller tends to maintain the strain sensed by the strain gauge at a desired value.

A dual fiber embodiment of the present invention has a second optical fiber and a second in-fiber grating in a grating portion of the second optical fiber. In this embodiment, the first strain inducing member is operably connected to the second optical fiber and its applicator end is operable for applying strain to the second optical fiber, and the second strain inducing member is operably connected to the second optical fiber and its applicator end is operable for applying strain to the second optical fiber. The strain controller is operable to change a dimension of at least one of the first and second strain inducing members, thereby moving the applicator ends of the first and second strain inducing members in different directions such that strain is applied to the in-fiber grating of the second optical fiber to change a second optical path length corresponding to the second in-fiber grating. The first and second strain inducing members are connected to the second optical fiber such that, at any given time, the strain applied to the grating portion of the second optical fiber is greater than the strain in both of the first and second strain inducing members. The strain controller allows application of equal strains to the first and second in-fiber gratings by a mechanical coupling of the first and second optical fibers via the first and second strain inducing members.

The first strain inducing member is selected from the group consisting of: an acoustic wave transducer, a piezoelectric transducer, a pneumatic actuator, a hydraulic actuator, a member inducing strain due to heat induced dimension change, a member inducing strain due to cooling induced dimension change, and a motor controlled dimension changing structure. The second strain inducing member is selected from the group consisting of: a relatively constant dimension member which simply transmits strain caused by a dimension change by the first strain inducing member, an acoustic wave transducer, a piezoelectric transducer, a pneumatic actuator, a hydraulic actuator, a member inducing strain due to heat induced dimension change, a member inducing strain due to cooling induced dimension change, and a motor controlled dimension changing structure.

The present invention may alternately be described as an optical fiber device including a first optical fiber and an in-fiber grating defining first and second regions of the first optical fiber on opposite ends thereof and a grating portion of the first optical fiber between the first and second regions. A first strain inducing member extends in a lengthwise direction along the length of the first optical fiber, is operably connected to the first optical fiber, and has an applicator end for applying strain to the first optical fiber and a remote end opposite the applicator end. A second strain inducing member extends in the lengthwise direction along the length of the first optical fiber, is operably connected to the first optical fiber, and has an applicator end for applying strain to the first optical fiber and a remote end opposite the applicator end. A strain controller is operable to place a lengthwise strain on at least one of the first and second strain inducing members, thereby moving the applicator ends of the first and second strain inducing members in opposite directions such that lengthwise strain is applied to the in-fiber grating to change a first optical path length of the in-fiber grating. The first and second strain inducing members are connected to the first optical fiber such that, at any given time, the strain applied to the grating portion is greater than the strain in both of the first and second strain inducing members.

In one embodiment, the applicator end of the first strain inducing member is fixed relative to the first region, the applicator end of the second strain inducing member is fixed relative to the second region, the remote end of the first strain inducing member is fixed relative to the remote end of the second strain inducing member, and each of individual lengths of the first and second strain inducing members is greater than a length of the grating portion.

Another embodiment has a third strain inducing member operably connected to the first optical fiber and having an applicator end for applying strain to the first optical fiber and a remote end opposite the applicator end. The third strain inducing member extending in a lengthwise direction along the length of the first optical fiber and the strain controller is operable to place a lengthwise strain on all of the first, second, and third strain inducing members, the first, second, and third strain inducing members being operable responsive thereto to place a greater lengthwise strain on the grating portion than on the greatest of strains at a given time on each of the first, second, and third strain inducing members. The applicator end of the first strain inducing member is fixed relative to the first region, the applicator end of the third strain inducing member is fixed relative to the second region, the remote end of the first strain inducing member is fixed relative to the remote end of the second strain inducing member, the applicator end of the second strain inducing member is fixed relative to the remote end of the third strain inducing member. The connection of the applicator end of the second strain inducing member to the optical fiber is by way of the third strain inducing member, each of individual lengths of the first, second, and third strain inducing members is greater than a length of the grating portion.

The strain controller is selected from the group consisting of: an electric power supply, a resistive heating element, a thermoelectric cooler, a motor, and a pump.

The strain controller is operable to cause a lengthwise strain on each of the first and second strain inducing members, the strain controller is operable to cause a lengthwise strain on the first strain inducing member without the second strain inducing member being an intermediary to the strain controller and the first strain inducing member, and the strain controller is operable to cause a lengthwise strain on the second strain inducing member without the first strain inducing member being an intermediary to the strain controller and the second strain inducing member.

In one embodiment, each of the first and second strain inducing members is a piezoelectric member.

A dual fiber embodiment includes a second optical fiber and a second in-fiber grating in a grating portion of the second optical fiber. The first strain inducing member is operably connected to the second optical fiber and its applicator end is operable for applying lengthwise strain to the second optical fiber. The second strain inducing member is operably connected to the second optical fiber and its applicator end is operable for applying lengthwise strain to the second optical fiber. The strain controller is operable to apply strain to the in-fiber grating of the second optical fiber to change a second optical path length corresponding to the second in-fiber grating. The first and second strain inducing members are connected to the second optical fiber such that, at any given time, the strain applied to the grating portion of the second optical fiber is greater than the strain in both of the first and second strain inducing members, and the strain controller allows application of equal strains to the first and second in-fiber gratings by a mechanical coupling of the first and second optical fibers via the first and second strain inducing members.

The present invention may alternately be described as an optical fiber device including a first optical fiber; an in-fiber grating in a grating portion of the first optical fiber; a first strain inducing member operably connected to the first optical fiber and having an applicator end for applying radial strain to the first optical fiber and a remote end opposite the applicator end; a second strain inducing member operably connected to the first optical fiber and having an applicator end for applying radial strain to the first optical fiber and a remote end opposite the applicator end; a strain controller operable to change a dimension of at least one of the first strain inducing member and the second strain inducing member, thereby moving the applicator ends of the first and second strain inducing members in different directions such that strain is applied to the in-fiber grating to change a first optical path length of the in-fiber grating, and wherein the first and second strain inducing members are connected to the first optical fiber such that, at any given time, the strain applied to the grating portion is greater than the strain in both of the first and second strain inducing members.

Each of the first and second strain inducing members are connected to the first optical fiber by way of corresponding first and second strain increaser members, each having a relatively large outer surface area to which the corresponding strain inducing member applies strain and a relatively small inner surface area operably connected to transmit increased strain to the in-fiber grating. The inner surface area may be further reduced by reducing the fiber diameter in the grating portion as in the incorporated by reference Schmadel and Culver patent.

The optical fiber may be surrounded by a piezoelectric shell, which is in turn surrounded by a high modulus shell which localizes radial strain generated by the piezoelectric shell to the cylindrical volume inside the high modulus shell. Strain increaser members then operate on the high modulus shell.

The device may further include: a strain gauge operably connected to at least one of the first strain inducing member and the second strain inducing member for measuring the strain thereof; and a feedback loop connecting the strain gauge to the strain controller such that the strain controller tends to maintain the strain sensed by the strain gauge at a desired value.

The strain controller is operable to cause a strain on each of the first and second strain inducing members, the strain controller being operable to cause a strain on the first strain inducing member without the second strain inducing member being an intermediary to the strain controller and the first strain inducing member, and the strain controller being operable to cause a strain on the second strain inducing member without the first strain inducing member being an intermediary to the strain controller and the second strain inducing member.

A third strain inducing member is mechanically in series with the first strain inducing member and wherein the strain controller is operable to cause a strain on the first strain inducing member without the third strain inducing member being an intermediary to the strain controller and the first strain inducing member, and the strain controller being operable to cause a strain on the third strain inducing member without the first strain inducing member being an intermediary to the strain controller and the first strain inducing member. The first strain inducing member and third strain inducing member are different types of members selected from the group consisting of: an acoustic wave transducer, a piezoelectric transducer, a pneumatic actuator, a hydraulic actuator, a member inducing strain due to heat induced dimension change, a member inducing strain due to cooling induced dimension change, and a motor controlled dimension changing structure.

A third strain inducing member is operably connected to the first optical fiber and having an applicator end for applying radial strain to the first optical fiber and a remote end opposite the applicator end. The third strain inducing member is connected to the first optical fiber by way of a corresponding third strain increaser member, the third strain increaser member having a relatively large outer surface area to which the third strain inducing member applies strain and a relatively small inner surface area operably connected to transmit increased strain to the in-fiber grating.

A dual fiber embodiment includes a second optical fiber and a second in-fiber grating in a grating portion of the second optical fiber. The first strain inducing member is operably connected to the second optical fiber and its applicator end is operable for applying radial strain to the second optical fiber, and wherein the second strain inducing member is operably connected to the second optical fiber and its applicator end is operable for applying radial strain to the second optical fiber; and wherein the strain controller is operable to apply strain to the in-fiber grating of the second optical fiber to change a second optical path length corresponding to the second in-fiber grating, and wherein the first and second strain inducing members are connected to the second optical fiber such that, at any given time, the strain applied to the grating portion of the second optical fiber is greater than the strain in both of the first and second strain inducing members, and wherein the strain controller allows application of equal strains to the first and second in-fiber gratings by a mechanical coupling of the first and second optical fibers via the first and second strain inducing members.

The optical fiber device further includes: a first coupler coupling the first and second optical fibers and a second coupler coupling the first and second optical fibers, the in-fiber grating of each of the first and second optical fibers being between the first and second couplers. Each of the first and second optical fibers are different arms of an interferometer.

The present invention may alternately be described as an optical fiber device including: first and second optical fibers; an in-fiber grating in a grating portion of each of the first and second optical fibers; a first strain inducing member operably connected to the first and second optical fibers for applying strain thereto and having an applicator end and a remote end opposite the applicator end; a strain controller operable to change a dimension of the first strain inducing member such that strain is applied to the in-fiber gratings of the first and second optical fibers to change corresponding first and second optical path lengths of the in-fiber gratings, and wherein the strain controller allows application of equal strains to the first and second in-fiber gratings by a mechanical coupling of the first and second optical fibers via the first strain inducing member.

A first coupler coupling the first and second optical fibers and a second coupler coupling the first and second optical fibers, the in-fiber grating of each of the first and second optical fibers being between the first and second couplers. Each of the first and second optical fibers are different arms of an interferometer.

In an embodiment, a second strain inducing member is operably connected to the first and second optical fibers for applying strain to the first and second optical fibers, and having an applicator end and a remote end opposite the applicator end, and the strain controller allows application of equal strains to the first and second in-fiber gratings by a mechanical coupling of the first and second optical fibers via the first and second strain inducing members, and wherein the first and second strain inducing members are connected to the first and second optical fibers such that, at any given time, the strain applied to the grating portion of each of the first and second optical fibers is greater than the strain in both of the first and second strain inducing members.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 8 is a simplified end view with parts in cross section of a seventh embodiment optical fiber device according to the present invention, whereas FIGS. 8A and 8B are side and top views of portions of this embodiment;

FIG. 9 is an end view showing more details of the FIG. 8 arrangement with duplicate parts left out for ease of illustration and having a circuit arrangement shown;

DETAILED DESCRIPTION

Figures 1, 2:
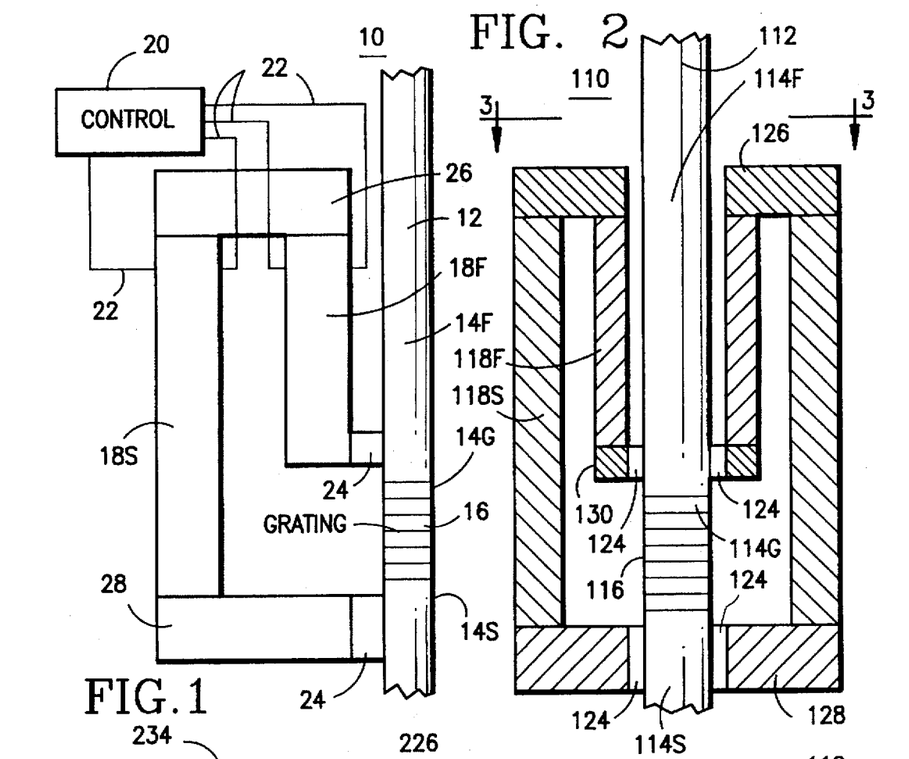
FIG. 1 is a simplified side view of a first embodiment optical fiber device according to the present invention.
FIG. 2 is a side cross section view of a second embodiment optical fiber device according to the present invention with the cross section taken along lines 2—2 of FIG. 3.

Before discussing the first embodiment of the present invention with reference to FIG. 1, it is noted that numerous embodiments are disclosed herein. The components of the first embodiment are two digit numbers. To avoid unnecessary repetition, the components of the second embodiment will be numbered in the 100 series with the same last two digits as the corresponding components, if any, in the first embodiment. In similar fashion, the components of the third embodiment will be numbered in the 200 series with the same last two digits as the corresponding components, if any, in the first or second embodiments. The pattern continues for the other embodiments. Except for differences shown, discussed, or readily understood from the context, all components with the same last two digits will be constructed and operate the same.

The fiber optic device 10 of FIG. 1 includes an optical fiber having first and second regions 14F and 14S respectively. The regions are separated by grating portion 14G of the fiber in which a Bragg diffraction in-fiber grating 16 is disposed in the light guiding core (core not separately shown). The optical characteristics (such as reflection spectra) of the grating are modified to realize optical devices such as the modulators, interferometers, transceivers, optical switches, drop/insert devices (which drop one or more optical signals and add one or more optical signals), and optical fiber networks disclosed in the incorporated by reference parent application to the present application and/or to realize the various optical systems disclosed in the incorporated by reference application filed concurrently herewith.

The arrangement of FIG. 1 provides for mechanical leverage such that the strain applied to the grating portion 14G and the grating 16 therein may be higher than would otherwise be the case. This allows for a higher figure of merit corresponding to a greater change in the optical characteristics of the grating. For example, the arrangement can produce an expanded grating spectrum tuning range.

The mechanical leverage arrangement of FIG. 1 uses first and second strain inducing members 18F and 18S respectively, which members may for example be piezoelectric bars powered by an adjustable electric power source 20 functioning as a strain controller and using wires 22. The piezoelectric bars may more specifically be piezoelectric devices operated in the D31 excitation mode such that their lengths change, the lengths being parallel to the lengthwise direction of the fiber 12.

First member 18F is fixed at an applicator end (lower end in FIG. 1) to the first region 14F immediately adjacent the edge of the grating portion 14G as by bonding material 24. A remote end (upper end in FIG. 1) of the first member 18F is fixed to a remote end (upper end in FIG. 1) of the second member 18S as by rigid or essentially rigid connecting block 26. An applicator end (lower end in FIG. 1) of second member 18S is fixed to the first region 14F immediately adjacent the edge of the grating portion 14G as by rigid or essentially rigid connecting block 28 and bonding material 24.

As used herein, the applicator end of a strain inducing member will be the end closest to where the member applies force to the fiber, whereas the remote end will be the opposite end. For arrangements where both ends of a strain inducing member are equally removed from the application of force to the fiber, either end may be considered as an applicator end and the opposite end may be considered as the remote end. As used herein, immediately adjacent means within one cm of the edge of the grating portion.

The strain inducing member 18F is used for pulling the fiber at bonding material 24 on region 14F as member 18F pulls its ends towards its center when the strain controller 20 supplies appropriate power to piezo member 18F. The second strain inducing member 18S is used to push blocks 26 and 28 apart by increasing in length when controller 20 supplies appropriate power to piezo member 18S. Because of the connections between members 18F and 18S and fiber 14, the strain applied to grating portion 14G depends on the strain within both members 18F and 18S and is greater than the strain caused by operation of either of the members 18F and 18S under control of controller 20.

A simplified example (with numbers made up for illustrative purposes only based on ease of explanation and computation) may best demonstrate how the FIG. 1 arrangement provides an increased amount of strain in the grating portion (thereby providing an increased figure of merit). Suppose members 18F and 18S are respectively 10 cm long and 12 cm long and grating portion is 2 cm long. If member 18S can change its length by 0.12 cm corresponding to one percent length change and member 18F can change its length by 0.1 cm corresponding to one percent length change. By virtue of the connections to the optical fiber 12, the strain is concentrated at the grating portion 14G. The application of both the pulling and pushing strain by the two members 18F and 18S will cause the total length change of 0.22 cm to be applied to the 2 cm grating portion, which is greater than a ten percent length change. Basically then, the strain is concentrated by a mechanical leverage arrangement. The strain in the grating portion 14G in such an example would be 0.11.

As will be readily understood, a particular strain inducing member could pull part of the time and push other parts of the time depending on input control signals.

The inner surface area may be further reduced by reducing the fiber diameter in the grating portion as in the incorporated by reference Schmadel and Culver patent.

Figures 3, 4:
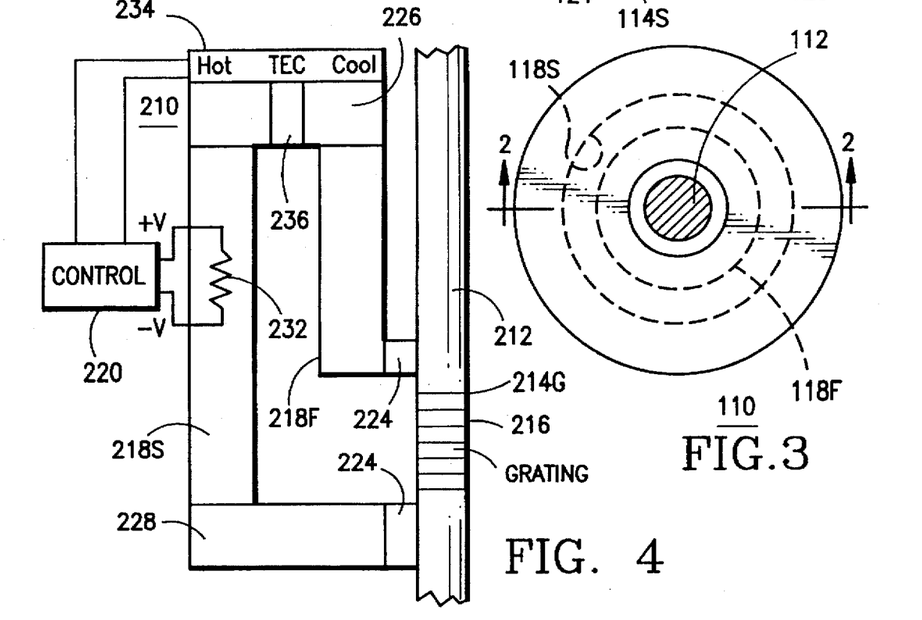
FIG. 3 is a cross section end view taken along lines 3—3 of FIG. 2.
FIG. 4 is a simplified side view of a third embodiment optical fiber device according to the present invention.

Turning now to FIGS. 2 and 3, a second embodiment device 110 has optical fiber 112 with first and second regions 114F and 114S and grating portion 114G having grating 116 therein. Bonding material 124 is used. For ease of illustration wires such as 22 of FIG. 1 and a strain controller 20 are not shown for the second embodiment, but they could be used in essentially the same fashion as with the first embodiment. Device 110 is different than device 10 in that blocks 126 and 128 are circular, each having a hole for the fiber 112. First and second strain inducing members 118F and 118S are hollow cylindrical piezoelectric members which change length (for pulling and pushing) when electric signals are applied thereto. Device 110 is cylindrically symmetric (i.e., about the central axis of fiber 112) and avoids any effects of assymetry which might occur in the FIG. 1 embodiment. Another, less important difference between the first and second embodiment is that device 110 may include an optional ring or disc shaped connecting block 130 between the applicator end of member 118F and bonding material 124.

Instead of having members 118F and 118S being hollow cylinders of piezoelectric material, each could alternately be several piezoelectric bars (not shown) arranged in a circumferential pattern.

FIG. 4 shows a third embodiment optical fiber device having fiber 212, grating portion 214G, grating 216, first and second strain inducing members 218F and 218S, bonding material 224, and connecting blocks 226 and 228.

FIG. 4 actually shows two techniques for thermal strain inducing, which techniques could be used together or separately. In this case one or preferably both of the members 218F and 218S may be aluminum or other metal bars changing length with temperature changes.

A first thermal technique has a resistance heating element 232 controlled by power source/strain controller 220 and in thermal contact with member 218S so as to cause it to expand in length, serving as a pushing member in the same basic sense as member 18S of FIG. 1. The member 218F may simply be a rigid or essentially rigid member. In that case, it is a relatively constant dimension member which simply transmits strain caused by a dimension change by the member 218S. That arrangement does not provide the advantages of combined pushing and pulling as the previous embodiments do, but still concentrates the strain due to bonding of the structures immediately adjacent the grating portion 214G.

A second thermal technique uses a thermoelectric cooler (TEC) 234 to simultaneously heat thermal expansion member 218S and cool thermal contraction member 218F such that they respectively serve as pushing and pulling members in the same sense as members 18S and 18F of FIG. 1. TEC 234 may be controlled by power source/strain controller 220.

Figures 5, 6, 7, 11:
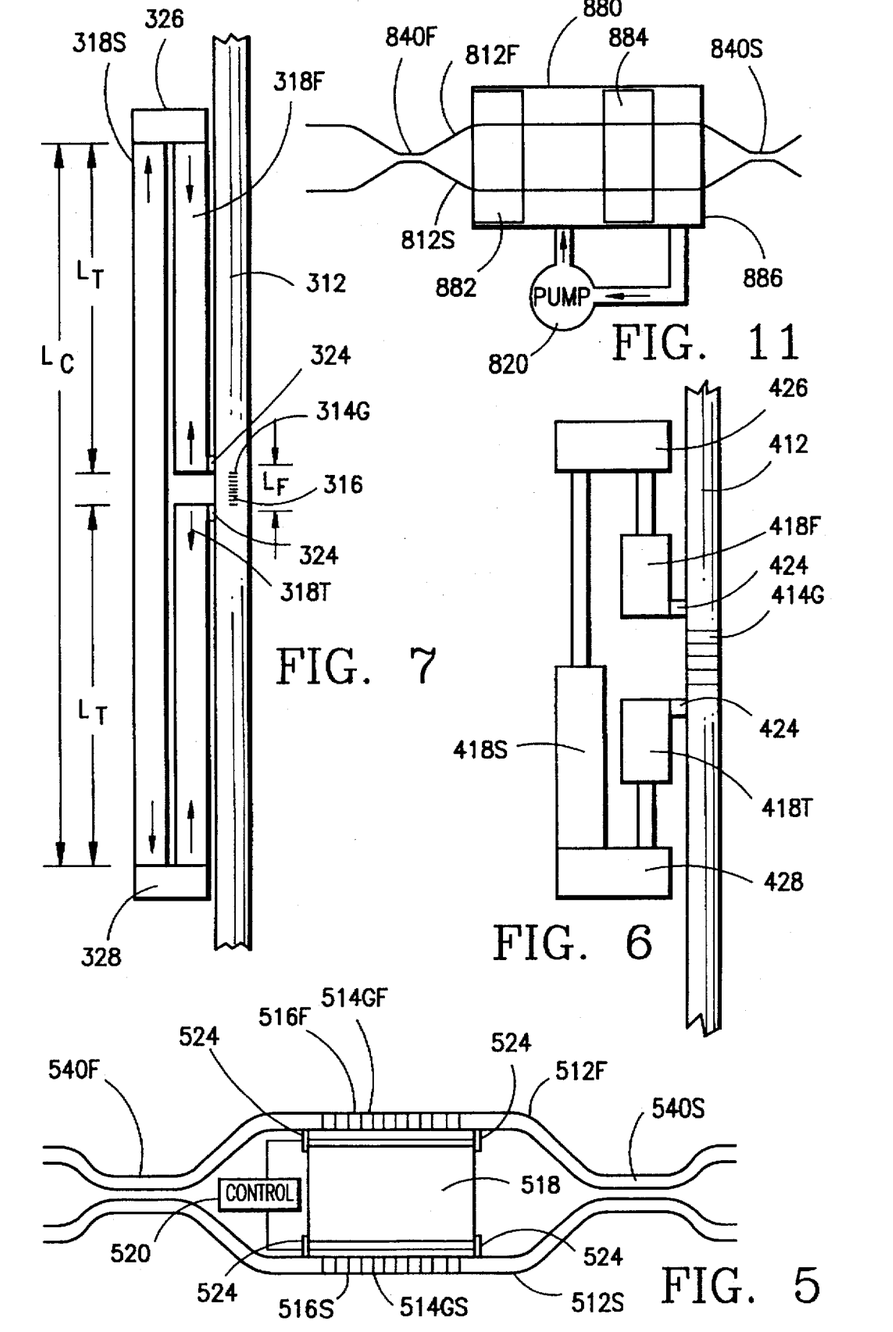
FIG. 5 is a simplified side view of a fourth embodiment optical fiber device according to the present invention.
FIG. 6 is a simplified side view of a fifth embodiment optical fiber device according to the present invention.
FIG. 7 is a simplified side view of a sixth embodiment optical fiber device according to the present invention.
FIG. 11 is a simplified side view with parts in cross section of a ninth embodiment optical fiber device according to the present invention.

FIG. 5 shows a fourth embodiment optical fiber device having fiber 312, grating portion 314G, grating 316, first and second strain inducing members 318F and 318S, bonding material 324, and connecting blocks 326 and 328. In this embodiment, members 318F and 318S serve as pulling and pushing members such as with 18F and 18S of FIG. 1. However, instead of block 328 connecting directly to the fiber 312, a third strain inducing member 318T has a remote end connected to the remote or lower end of member 318S by each being fixed to the block 328. The member 318T has an upper or applicator end fixed to the fiber 312 immediately adjacent to the grating portion 314G. Each of the members 318F, 318S, and 318T may be piezoelectric bars as discussed above and may have a power supply (not shown) serving as a strain controller. Alternately, any of the other types of strain inducing members discussed above and below could be used.

The FIG. 5 arrangement uses members 318F and 318T (each having length $L_T$) as pulling members and member 318S (having length $L_C$) as a pushing member. The grating portion extends over length $L_F$. From FIG. 5, $$L_F = L_C - 2L_T \tag{1}$$

Assuming that the maximum strain is S for each of members 318F, 318S, and 318T, the maximum and minimum lengths for the grating portion are as follows:

$$L_{FMAX} = L_C(1+S) - 2L_T(1-S) \tag{2}$$

$$L_{FMIN} = L_C(1-S) - 2L_T(1+S) \tag{3}$$

Therefore, $$L_{FMAX} - L_{FMIN} = L_C(2S) + 2L_T(2S) \tag{4}$$

The strain, $S_F$ in the grating portion 314G of the fiber, neglecting the effect of the fiber modulus, is calculated as follows:

$$S_F = (L_{FMAX} - L_{FMIN})/L_F \tag{5}$$

$$S_F = (2S(L_C + 2L_T))/(L_C - 2L_T) \tag{6}$$

Therefore, the strain in the grating portion is a multiple of the strain in the strain inducing members. More specifically, the concentration or multiplication effect of the mechanical structure depends on the ratio of the sum of lengths of the strain inducing members to the length of the grating portion.

Taking a numerical example where $$S = 10^{-4}$$

$$L_C = 10 \text{ cm}$$

$$L_T = 4.5 \text{ cm}$$

$$S_F = \frac{2 \times 10^{-4} (10 + 2 \times 4.5)}{10 - 2 \times 4.5}$$

$$S_F = 3.8 \times 10^{-3}$$

Thus, the strain in the grating portion is over ten times the strain in the strain in any of the strain inducing members. For purposes of the example, it was assumed that the strain inducing members all had equal strain. However, even if that is not the case, the strain in the grating portion, at a given time, will be greater than the greatest of the strains in the strain inducing members.

FIG. 6 shows a fifth embodiment optical fiber device having fiber 412, grating portion 414G, grating 416, first, second and third strain inducing members 418F, 418S, and 418T, bonding material 424, and connecting blocks 426 and 428. In this embodiment, members 418F and 418T serve as pulling members and member 418S serves as a pushing member in much the same way as the corresponding members of FIG. 5. However, in this case, members 418F, 418S, and 418T are pressurized fluid (hydraulic or pneumatic) cylinders powered by a fluid pressure source/strain controller (not shown). The cylinders may each be double acting so that each may pull and push, or they may be single acting such that they can be powered to apply force in only one direction.

Turning now to FIG. 7, a dual fiber embodiment of the present invention has first and second optical fibers 512F and 512S with respective first and second grating portions 514GF and 514GS with gratings 516F and 516S disposed therein. Strain inducing member 518 is a piezoelectric block such as, for example, a 20 mm high PZT-5H unit made by the Electro Ceramics Division of Morgan Matroc Inc., which is bonded to the fibers at points 524. Under control of an electrical signal supplied by power source/strain controller 520, block or member 518 changes the length of the grating portions in the two fibers by the same amount due to the mechanical coupling between the two fibers via block 518. Thus, equal strain is applied to both grating portions in the two fibers.

First and second couplers 540F and 540S are at opposite ends of the grating portions of the two fibers and they function in the same way as couplers 92 and 93 of FIG. 12 of the incorporated by reference parent application. Basically, the fibers 512F and 512G are different arms of an interferometer structure as explained in that application. The structure may be used as a modulator and for the various purposes described in the parent application. However, unlike the FIG. 12 arrangement of the parent application which used separate strain inducing members for the separate fibers, the mechanical coupling of the two fibers in the present FIG. 7 by use of block 518 as a common strain inducing member may more readily insure that both grating portions are under the same strain. In other words, slight differences in response of two separate strain inducing members (parts of both switches 81 in FIG. 12 of the parent application) which might cause slight variations in strain between the two fibers are avoided by the mechanical (as opposed to electrical) coupling in present FIG. 7.

Figures 8, 8A, 8B, 9:
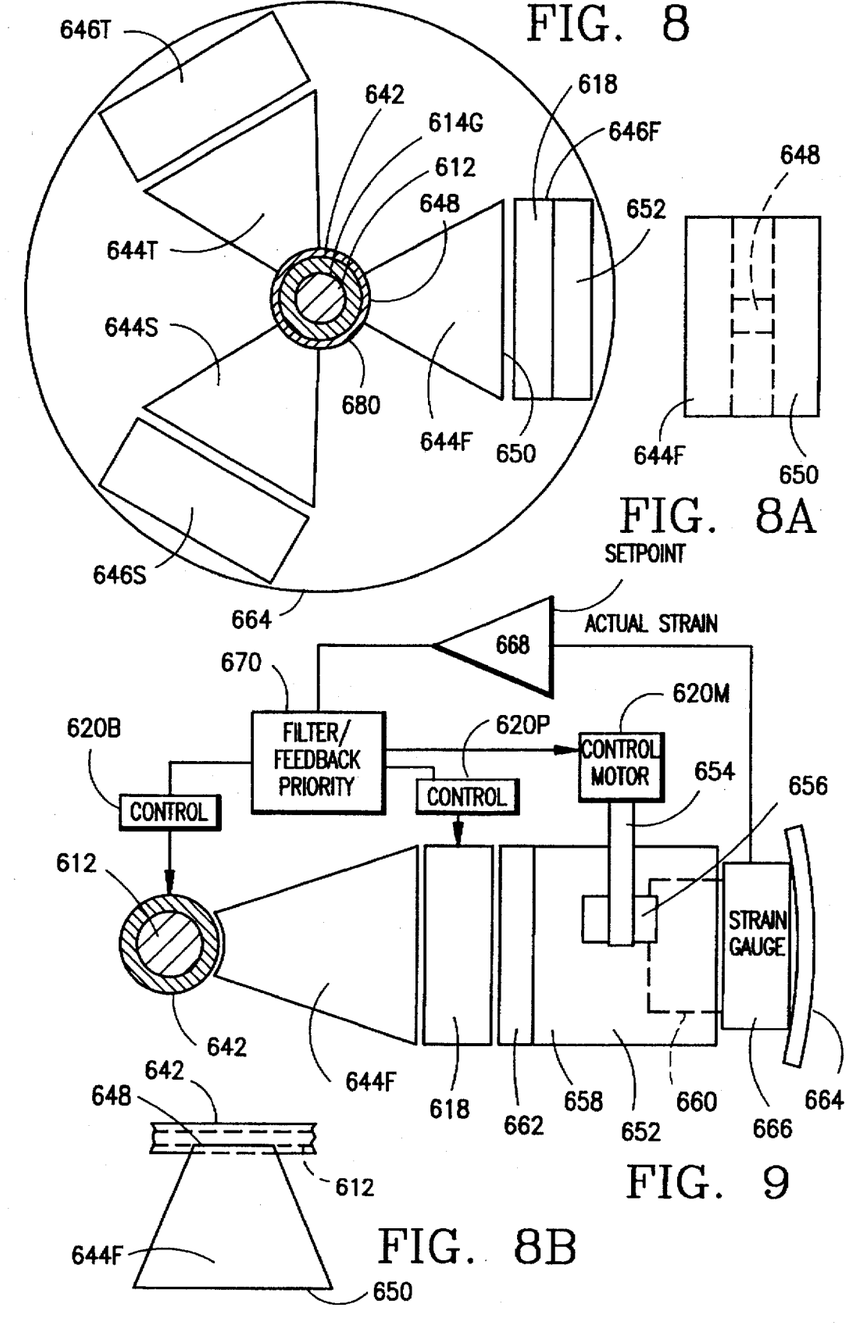

The embodiments discussed so far have involved changing the optical characteristics of grating portions of fibers by placing lengthwise strain on them. With reference now to FIG. 8, an arrangement for placing radial strain on grating portion 614G (grating not separately shown) of fiber 612 will be discussed. Surrounding grating portion 614G is a piezoelectric cylindrical device 642 which is constructed and operable as described by Jarzynski, op. cit., except that a high modulus shell 680 in energy transfer contact with and immediately surrounding the piezoelectric shell, assures that radial strain generated by the piezoelectric shell will be mainly localized to the cylindrical volume inside the high modulus shell. Device 642 comprising grating portion 614G of fiber 612, piezoelectric cylindrical shell device 642 and high modulus shell 680 is used for placing variable quasi-static radial strain on grating portion 614G.

Radially outside of device 642 are identical first, second, and third strain increaser members 644F, 644S, and 644T and identical first, second, and third strain inducing structures 646F, 646S, and 646T. The discussion which follows will concentrate on member 644F and structure 646F, but it will apply to the like numbered equivalent second and third components.

Member 644F is, in the plane of view of FIG. 8, shaped like an isoceles triangle (two equal sides extending towards the fiber 612) except one vertex of the triangle is not present and is replaced by the circular surface 648 (cylindrically extending into the plane of view of FIG. 8), which surface conforms to the outer surface of device 642. (If optional device 642 is not used, the surface 648 would conform to the outer surface of the fiber 612.) With reference also to FIGS. 8A and 8B respectively showing a radially inward view and a top view of member 644F, it will be seen that the relatively large outer surface area 650 tapers down in two orthogonal directions to the relatively small inner surface area 648 within the inner dashed line block of FIG. 8A. Therefore, when the strain inducing structure 646F applies a pushing force and strain to the large surface area 650, it causes a greater force per unit area and strain to be applied to the fiber 612 by way of small surface area 648 and device 642.

Considering FIGS. 8 and 9 together, the strain inducing structure 646F includes a piezoelectric strain inducing member 618 and a motor operated strain inducing member 652. Member 618 may apply a pushing force to surface 650 (to cause strain in the fiber) under control of a power source/piezo block strain controller 620P, whereas shell or cylindrical device 642 applies strain under control of a power source/piezo block strain controller 620B. The combined power supply/motor 620M serves as a strain controller for the motor operated strain inducing member or structure 652.

With reference to FIG. 9, the member or structure 652 is driven by motor shaft 654 turning worm gear 656 which in turn meshes with outer threads (not shown) of a worm gear 658. The worm gear may be hollow and have two separate interior threads having different thread pitch (not shown) mating with exterior threads (not shown) of fixed worm mount 660 and pressing member 662. The pressing member 662 is at the left end of worm gear 658. Pressing member 662 is moved right and left in FIG. 9 to place more or less strain on member 618 (which strain is conveyed through to 644F and onto fiber 612). Relative motion of pressing base 662 and fixed base 660 effectively adjusts the length of the member or structure 652 under control of the motor 620M. Pressing member 662 is constrained not to rotate relative to fixed worm gear mount 660 by sliding guides, not shown.

Therefore, the arrangement of FIGS. 8 and 9 includes three types of strain inducing techniques: the piezo device 642 with a relatively fast response time, the piezo block 618 with an intermediate response time, and the motor operated structure 652 with a relatively slow response time. If desired, an arrangement could use any two of these three techniques or even a single one of the three techniques without using the others.

With reference to FIGS. 8 and 9, an outer fixed cylindrical base 664 provides a stable platform from which the various components 642 and 646F (made of components 618 and 652) can push against. There would of course be three each of components 618 and 652, one of each for each of structures 646F, 646S, and 646T. The controls 620B, 620P, and 620M may collectively or singly be considered as strain controllers.

As shown in FIG. 9, the fixed base 660 is fixed to base 664 by way of a strain gauge 666. Gauge 666 sends a signal representative of the actual strain to a feedback circuit having differential amplifier 668 to compare the actual strain with the setpoint which corresponds to the desired strain. The desired strain would be adjustable. Although the actual strain sensed by gauge 666 would be different from the strain of fiber 612, there would be a correspondence so that the feedback loop could maintain the actual strain in the grating portion 614G at an essentially constant value absent changes in the setpoint. The error signal out of amplifier 668 is supplied to a filter circuit 670 which filters high frequency signals to the fast response strain inducer 642, intermediate signals to the intermediate response strain inducer 618, and low frequency signals to the slow response strain inducer 652. In that fashion, the actual strain is held very close to the desired strain of the setpoint.

The filter circuit 670 may also include a priority arrangement to try to minimize the signals out of controls 620B and 620P. An example may best serve to explain this feature by reference to numbers made up for ease of discussion. Suppose the setpoint is 10 and the strain gauge is giving an actual strain of 10. The error signal is now zero. Assuming the setpoint jumps quickly (i.e., high frequency) to 12, the error signal of 2 is supplied to control 620B by filter 670. Fast response device 642 increases strain very quickly until the error signal is again zero. However, rather then use the power consuming strain inducer 642 for a steady state strain, circuit 670 may slowly increase the strain applied by motor 620M operating structure 652 until it supplies all the strain required to maintain the actual strain at the setpoint. At the same time, the circuit 670 (it could be a computer or an analog circuit arrangement) slowly decreases the strain induced by 642 until it is zero. A more sophisticated arrangement may slowly shift strain inducing from 642 to 618 to 652, whereas strain inducing could also be shifted from 618 to 652 without affecting 642. At any rate, the feedback arrangement would tend to zero out the strain induced by the power consuming strain inducers 642 and 618 and replace it by inducing strain using structure 652. The advantage here is that structure 652 does not need continued power to apply a steady state strain. Thus, this arrangement reduces the power consumption.

Figure 10:
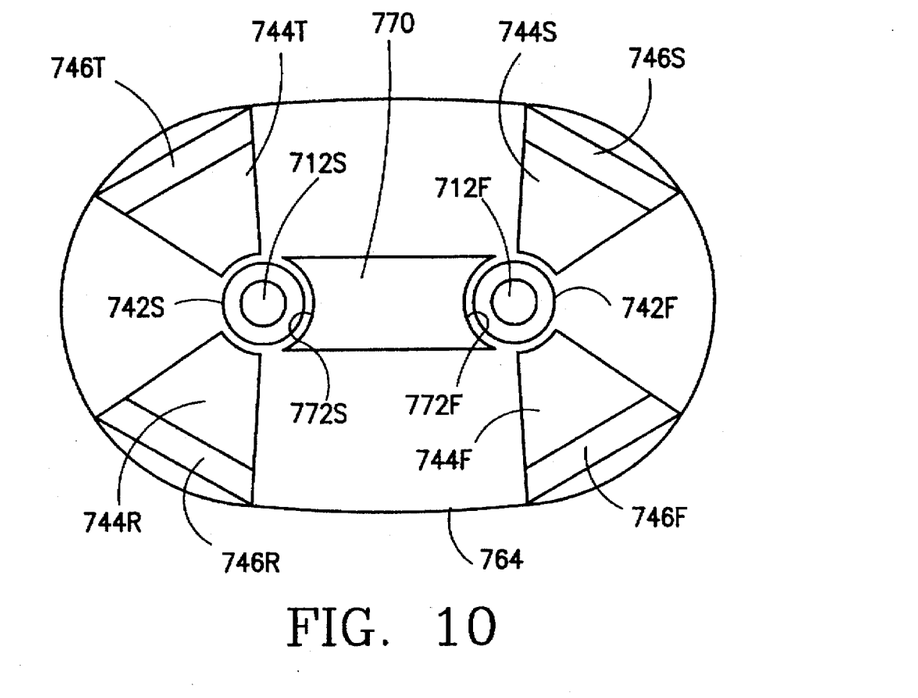
FIG. 10 is a simplified end view with parts in cross section of an eighth embodiment optical fiber device according to the present invention.

Turning now to FIG. 10, a radial dual fiber strain inducing arrangement has outer base 764 (which may be slightly different in shape than base 664), first through fourth members 744F, 744S, 744T, and 744R, first through fourth members 746F, 746S, 746T, and 746R, and first and second devices 742F and 742S, each of which is constructed and operates in essentially the same way as the corresponding components of FIG. 8. However, in addition to having four, instead of three, of the strain increasing members and the strain inducing structures, FIG. 10 has two fibers 712F and 712S and a connecting block 770 having cylindrical surfaces 772F and 772S (extending into the plane of view of FIG. 11) therebetween. The block 770 provides a mechanical coupling between the two fibers to equalize strain therein. As such, the fibers may be used as arms of an interferometer and for the purposes discussed relative to FIG. 7 above.

FIG. 11 shows a dual fiber arrangement in simplified form with fibers 812F and 812S having grating portions therein (gratings and grating portions not showns for simplicity) and couplers 840F and 840S all of which may operate as with FIG. 7 above. FIG. 11 is different in that equal strain is produced in the fibers by a hydraulic cylinder 880 having a fixed end 882 to which the fibers are secured, a movable piston 884 to which the fibers are fixed, and a fixed end 886 through which the fibers pass by way of low pressure seals. By moving the piston under control of a strain controller pump 820, equal strain can be applied to the gratings within the fibers. The piston may allow a small amount of fluid past its outer cylindrical surface.

Figure 12:
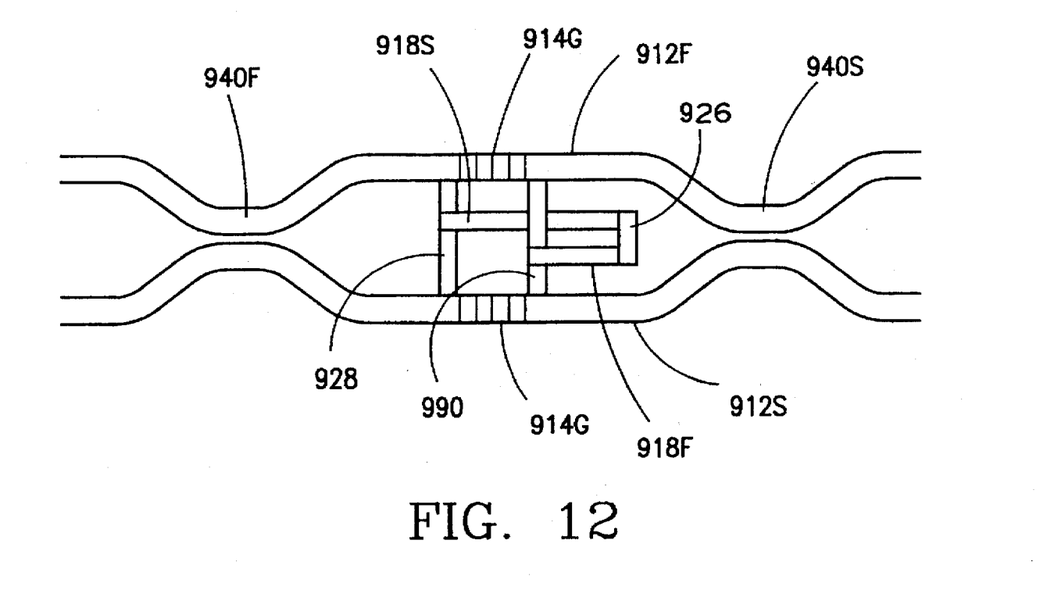
FIG. 12 is a simplified side view of a tenth embodiment optical fiber device according to the present invention.

FIG. 12 shows a dual fiber arrangement with fibers 912F and 912S having grating portions 914G therein and couplers 940F and 940S all of which may operate as with FIG. 7 above. FIG. 11 is different in that equal strain is produced in the fibers by a push-pull mechanical advantage arrangement similar to FIG. 1 and using components 918F, 918S, 926, and 928 each of which operate like the corresponding components of FIG. 1 except as noted below. Block 928 is bonded to both fibers 912F and block 990 is bonded to both fibers and allows the applicator end of strain inducing member 918F to be fixed relative to both fibers. Block 990 may include a hole, not shown, through which strain inducing member 918S extends.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. An optical fiber device comprising:

a first optical fiber;

an in-fiber grating in a grating portion of the first optical fiber;

a first strain inducing member operably connected to the first optical fiber and having an applicator end for applying strain to the first optical fiber and a remote end opposite the applicator end;

a second strain inducing member operably connected to the first optical fiber and having an applicator end for applying strain to the first optical fiber and a remote end opposite the applicator end;

a strain controller operable to change a dimension of at least one of the first and second strain inducing members, thereby moving the applicator ends of the first and second strain inducing members in different directions such that strain is applied to the in-fiber grating to change a first optical path length of the in-fiber grating, and wherein the first and second strain inducing members are connected to the first optical fiber such that, at any given time, the strain applied to the grating portion is greater than the strain in both of the first and second strain inducing members.

2. The optical fiber device of claim 1 wherein the first and second strain inducing members are connected to the first optical fiber such that, at any given time, the strain applied to the grating portion is greater than double the greater of the strains in the first and second strain inducing members.

3. The optical fiber device of claim 2 wherein the first and second strain inducing members are connected to the first optical fiber such that, at any given time, the strain applied to the grating portion is greater than ten times the greater of the strains in the first and second strain inducing members.

4. The optical fiber device of claim 1 wherein the first optical fiber has first and second regions on opposite ends of the grating portion; and wherein each of the first and second strain inducing members extend in a lengthwise direction along the length of the first optical fiber and the strain controller is operable to place a lengthwise strain on at least one of the first and second strain inducing members, the first and second strain inducing members being operable responsive thereto to place a greater lengthwise strain on the grating portion.

5. The optical fiber device of claim 4 wherein the applicator end of the first strain inducing member is fixed relative to the first region, the applicator end of the second strain inducing member is fixed relative to the second region, the remote end of the first strain inducing member is fixed relative to the remote end of the second strain inducing member, and each of individual lengths of the first and second strain inducing members is greater than a length of the grating portion.

6. The optical fiber device of claim 4 further comprising:
a third strain inducing member operably connected to the first optical fiber and having an applicator end for applying strain to the first optical fiber and a remote end opposite the applicator end, the third strain inducing member extending in a lengthwise direction along the length of the first optical fiber and the strain controller is operable to place a lengthwise strain on all of the first, second, and third strain inducing members, the first, second, and third strain inducing members being operable responsive thereto to place a greater lengthwise strain on the grating portion; and
wherein the applicator end of the first strain inducing member is fixed relative to the first region, the applicator end of the third strain inducing member is fixed relative to the second region, the remote end of the first strain inducing member is fixed relative to the remote end of the second strain inducing member, the applicator end of the second strain inducing member is fixed relative to the remote end of the third strain inducing member, the connection of the applicator end of the second strain inducing member to the optical fiber being by way of the third strain inducing member, each of individual lengths of the first, second, and third strain inducing members is greater than a length of the grating portion.

7. The optical fiber device of claim 1 wherein the strain controller is operable to induce radial strain in the in-fiber grating; and wherein each of the first and second strain inducing members are connected to the first optical fiber by way of corresponding first and second strain increaser members, each having a relatively large outer surface area to which the corresponding strain inducing member applies strain and a relatively small inner surface area operably connected to transmit strain to the in-fiber grating.

8. The optical fiber device of claim 7 further comprising:
a strain gauge operably connected to at least one of the first strain inducing member and the second strain inducing member for measuring the strain thereof; and
a feedback loop connecting the strain gauge to the strain controller such that the strain controller tends to maintain the strain sensed by the strain gauge at a desired value.

9. The optical fiber device of claim 1 further comprising:
a second optical fiber;
a second in-fiber grating in a grating portion of the second optical fiber; and
wherein the first strain inducing member is operably connected to the second optical fiber and its applicator end is operable for applying strain to the second optical fiber, and wherein the second strain inducing member is operably connected to the second optical fiber and its applicator end is operable for applying strain to the second optical fiber; and wherein the strain controller operable to change a dimension of at least one of the first and second strain inducing members, thereby moving the applicator ends of the first and second strain inducing members in different directions such that strain is applied to the in-fiber grating of the second optical fiber to change a second optical path length corresponding to the second in-fiber grating, and wherein the first and second strain inducing members are connected to the second optical fiber such that, at any given time, the strain applied to the grating portion of the second optical fiber is greater than the strain in both of the first and second strain inducing members, and wherein the strain controller allows application of equal strains to the first and second in-fiber gratings by a mechanical coupling of the first and second optical fibers via the first and second strain inducing members.

10. The optical fiber device of claim 1 wherein the first strain inducing member is selected from the group consisting of:
an acoustic wave transducer, a piezoelectric dimensional change transducer, a pneumatic actuator, a hydraulic actuator, a member inducing strain due to heat induced dimension change, a member inducing strain due to cooling induced dimension change, and a motor controlled dimension changing structure; and
wherein the second strain inducing member is selected from the group consisting of:
a relatively constant dimension member which simply transmits strain caused by a dimension change by the first strain inducing member, an acoustic wave transducer, a piezoelectric dimensional change transducer, a pneumatic actuator, a hydraulic actuator, a member inducing strain due to heat induced dimension change, a member inducing strain due to cooling induced dimension change, and a motor controlled dimension changing structure.

11. The optical fiber device of claim 1 wherein the diameter of grating portion of first optical fiber is reduced in order to reduce the force required to produce a given strain in grating portion of first optical fiber.

12. An optical fiber device comprising:
a first optical fiber;
an in-fiber grating defining first and second regions of the first optical fiber on opposite ends thereof and a grating portion of the first optical fiber between the first and second regions;
a first strain inducing member extending in a lengthwise direction along the length of the first optical fiber, operably connected to the first optical fiber, and having an applicator end for applying strain to the first optical fiber and a remote end opposite the applicator end;
a second strain inducing member extending in the lengthwise direction along the length of the first optical fiber, operably connected to the first optical fiber, and having an applicator end for applying strain to the first optical fiber and a remote end opposite the applicator end;
a strain controller operable to place a lengthwise strain on at least one of the first and second strain inducing members, thereby moving the applicator ends of the first and second strain inducing members in opposite directions such that lengthwise strain is applied to the in-fiber grating to change a first optical path length of the in-fiber grating, and wherein the first and second strain inducing members are connected to the first optical fiber such that, at any given time, the strain applied to the grating portion is greater than the strain in both of the first and second strain inducing members.

13. The optical fiber device of claim 12 wherein the applicator end of the first strain inducing member is fixed relative to the first region, the applicator end of the second strain inducing member is fixed relative to the second region, the remote end of the first strain inducing member is fixed relative to the remote end of the second strain inducing member, and each of individual lengths of the first and second strain inducing members is greater than a length of the grating portion.

14. The optical fiber device of claim 12 further comprising:

a third strain inducing member operably connected to the first optical fiber and having an applicator end for applying strain to the first optical fiber and a remote end opposite the applicator end, the third strain inducing member extending in a lengthwise direction along the length of the first optical fiber and the strain controller is operable to place a lengthwise strain on all of the first, second, and third strain inducing members, the first, second, and third strain inducing members being operable responsive thereto to place a greater lengthwise strain on the grating portion; and wherein the applicator end of the first strain inducing member is fixed relative to the first region, the applicator end of the third strain inducing member is fixed relative to the second region, the remote end of the first strain inducing member is fixed relative to the remote end of the second strain inducing member, the applicator end of the second strain inducing member is fixed relative to the remote end of the third strain inducing member, the connection of the applicator end of the second strain inducing member to the optical fiber being by way of the third strain inducing member, each of individual lengths of the first, second, and third strain inducing members is greater than a length of the grating portion.

15. The optical fiber device of claim 12 wherein the strain controller is selected from the group consisting of:

an electric power supply, a resistive heating element, a thermoelectric cooler, a motor, and a pump.

16. The optical fiber device of claim 12 wherein the strain controller is operable to cause a lengthwise strain on each of the first and second strain inducing members, the strain controller being operable to cause a lengthwise strain on the first strain inducing member without the second strain inducing member being an intermediary to the strain controller and the first strain inducing member, and the strain controller being operable to cause a lengthwise strain on the second strain inducing member without the first strain inducing member being an intermediary to the strain controller and the second strain inducing member.

17. The optical fiber device of claim 12 wherein each of the first and second strain inducing members is a piezoelectric member.

18. The optical fiber device of claim 12 further comprising:

a second optical fiber;

a second in-fiber grating in a grating portion of the second optical fiber; and wherein the first strain inducing member is operably connected to the second optical fiber and its applicator end is operable for applying lengthwise strain to the second optical fiber, and wherein the second strain inducing member is operably connected to the second optical fiber and its applicator end is operable for applying lengthwise strain to the second optical fiber; and wherein the strain controller is operable to apply strain to the in-fiber grating of the second optical fiber to change a second optical path length corresponding to the second in-fiber grating, and wherein the first and second strain inducing members are connected to the second optical fiber such that, at any given time, the strain applied to the grating portion of the second optical fiber is greater than the strain in both of the first and second strain inducing members, and wherein the strain controller allows application of equal strains to the first and second in-fiber gratings by a mechanical coupling of the first and second optical fibers via the first and second strain inducing members.

19. The optical fiber device of claim 12 wherein the first strain inducing member is selected from the group consisting of:

an acoustic wave transducer, a piezoelectric transducer, a pneumatic actuator, a hydraulic actuator, a member inducing strain due to heat induced dimension change, a member inducing strain due to cooling induced dimension change, and a motor controlled dimension changing structure; and wherein the second strain inducing member is selected from the group consisting of:

a relatively constant dimension member which simply transmits strain caused by a dimension change by the first strain inducing member, an acoustic wave transducer, a piezoelectric transducer, a pneumatic actuator, a hydraulic actuator, a member inducing strain due to heat induced dimension change, a member inducing strain due to cooling induced dimension change, and a motor controlled dimension changing structure.

20. An optical fiber device comprising:

a first optical fiber;

an in-fiber grating in a grating portion of the first optical fiber;

a first strain inducing member operably connected to the first optical fiber and having an applicator end for applying radial strain to the first optical fiber and a remote end opposite the applicator end;

a second strain inducing member operably connected to the first optical fiber and having an applicator end for applying radial strain to the first optical fiber and a remote end opposite the applicator end;

a strain controller operable to change a dimension of at least one of the first strain inducing member and the second strain inducing member, thereby moving the applicator ends of the first and second strain inducing members in different directions such that strain is applied to the in-fiber grating to change a first optical path length of the in-fiber grating, and wherein the first and second strain inducing members are connected to the first optical fiber such that, at any given time, the strain applied to the grating portion is greater than the strain in both of the first and second strain inducing members.

21. The optical fiber device of claim 20 wherein each of the first and second strain inducing members are connected to the first optical fiber by way of corresponding first and second strain increaser members, each having a relatively large outer surface area to which the corresponding strain inducing member applies strain and a relatively small inner surface area operably connected to transmit increased strain to the in-fiber grating.

22. The optical fiber device of claim 19 wherein the first strain inducing member is selected from the group consisting of:

an acoustic wave transducer, a piezoelectric dimensional change transducer, a pneumatic actuator, a hydraulic actuator, a member inducing strain due to heat induced dimension change, a member inducing strain due to cooling induced dimension change, and a motor controlled dimension changing structure; and wherein the second strain inducing member is selected from the group consisting of:

a relatively constant dimension member which simply transmits strain caused by a dimension change by the first strain inducing member, an acoustic wave transducer, a piezoelectric dimensional change transducer, a pneumatic actuator, a hydraulic actuator, a member inducing strain due to heat induced dimension change, a member inducing strain due to cooling induced dimension change, and a motor controlled dimension changing structure.

23. The optical fiber device of claim 21 wherein the strain controller is selected from the group consisting of:

an electric power supply, a resistive heating element, a thermoelectric cooler, a motor, and a pump.

24. The optical fiber device of claim 21 wherein the strain controller is operable to cause a strain on each of the first and second strain inducing members, the strain controller being operable to cause a strain on the first strain inducing member without the second strain inducing member being an intermediary to the strain controller and the first strain inducing member, and the strain controller being operable to cause a strain on the second strain inducing member without the first strain inducing member being an intermediary to the strain controller and the second strain inducing member.

25. The optical fiber device of claim 21 further comprising a third strain inducing member mechanically in series with the first strain inducing member and wherein the strain controller is operable to cause a strain on the first strain inducing member without the third strain inducing member being an intermediary to the strain controller and the first strain inducing member, and the strain controller being operable to cause a strain on the third strain inducing member without the first strain inducing member being an intermediary to the strain controller and the first strain inducing member, and wherein the first strain inducing member and third strain inducing member are different types of members selected from the group consisting of:

an acoustic wave transducer, a piezoelectric transducer, a pneumatic actuator, a hydraulic actuator, a member inducing strain due to heat induced dimension change, a member inducing strain due to cooling induced dimension change, and a motor controlled dimension changing structure.

26. The optical fiber device of claim 21 further comprising: a third strain inducing member operably connected to the first optical fiber and having an applicator end for applying radial strain to the first optical fiber and a remote end opposite the applicator end; and wherein the third strain inducing member is connected to the first optical fiber by way of a corresponding third strain increaser member, the third strain increaser member having a relatively large outer surface area to which the third strain inducing member applies strain and a relatively small inner surface area operably connected to transmit increased strain to the in-fiber grating.

27. The optical device of claim 26 further comprising: a first piezoelectric cylindrical shell surrounding grating portion of first optical fiber, a first high modulus cylindrical shell surrounding first piezoelectric cylindrical shell; and wherein the first piezoelectric cylindrical shell is operably connected to the first optical fiber and the first high modulus cylindrical shell acts to contain radial strain produced by the first piezoelectric cylindrical shell; and wherein radial strain produced by applicator ends of strain inducing members is shared among first high modulus cylindrical shell, first piezoelectric cylindrical shell and grating portion of first optical fiber.

28. The optical fiber device of claim 26 further comprising: a first coupler coupling the first and second optical fibers and a second coupler coupling the first and second optical fibers, the in-fiber grating of each of the first and second optical fibers being between the first and second couplers.

29. The optical fiber device of claim 19 further comprising:

a strain gauge operably connected to at least one of the first strain inducing member and the second strain inducing member for measuring the strain thereof; and a feedback loop connecting the strain gauge to the strain controller such that the strain controller tends to maintain the strain sensed by the strain gauge at a desired value.

30. The optical fiber device of claim 20 further comprising:

a second optical fiber;

a second in-fiber grating in a grating portion of the second optical fiber; and wherein the first strain inducing member is operably connected to the second optical fiber and its applicator end is operable for applying radial strain to the second optical fiber, and wherein the second strain inducing member is operably connected to the second optical fiber and its applicator end is operable for applying radial strain to the second optical fiber; and wherein the strain controller is operable to apply strain to the in-fiber grating of the second optical fiber to change a second optical path length corresponding to the second in-fiber grating, and wherein the first and second strain inducing members are connected to the second optical fiber such that, at any given time, the strain applied to the grating portion of the second optical fiber is greater than the strain in both of the first and second strain inducing members, and wherein the strain controller allows application of equal strains to the first and second in-fiber gratings by a mechanical coupling of the first and second optical fibers via the first and second strain inducing members.

31. The optical fiber device of claim 30 wherein each of the first and second optical fibers are different arms of an interferometer.

32. An optical fiber device comprising:

first and second optical fibers; an in-fiber grating in a grating portion of each of the first and second optical fibers;

a first strain inducing member operably connected to the first and second optical fibers for applying strain thereto and having an applicator end and a remote end opposite the applicator end; a strain controller operable to change a dimension of the first strain inducing member such that strain is applied to the in-fiber gratings of the first and second optical fibers to change corresponding first and second optical path lengths of the in-fiber gratings, and wherein the strain controller allows application of equal strains to the first and second in-fiber gratings by a mechanical coupling of the first and second optical fibers via the first strain inducing member.

33. The optical fiber device of claim 32 further comprising: a first coupler coupling the first and second optical fibers and a second coupler coupling the first and second optical fibers, the in-fiber grating of each of the first and second optical fibers being between the first and second couplers.

34. The optical fiber device of claim 33 wherein each of the first and second optical fibers are different arms of an interferometer.

35. The optical fiber device of claim 32 further comprising: a second strain inducing member operably connected to the first and second optical fibers for applying strain to the first and second optical fibers, and having an applicator end and a remote end opposite the applicator end, and the strain controller allows application of equal strains to the first and second in-fiber gratings by a mechanical coupling of the first and second optical fibers via the first and second strain inducing members, and wherein the first and second strain inducing members are connected to the first and second optical fibers such that, at any given time, the strain applied to the grating portion of each of the first and second optical fibers is greater than the strain in both of the first and second strain inducing members.

* * * * *

UNITED STATES PATENT AND TRADEMARK OFFICE
CERTIFICATE OF CORRECTION

PATENT NO. : 5,682,445
DATED : October 28, 1997
INVENTOR(S) : Ronald H. SMITH

It is certified that error appears in the above-indentified patent and that said Letters Patent is hereby corrected as shown below:

Claim 22, line 1 (column 21, line 7), change "claim 19" to -- claim 21 --;

Claim 29, line 1 (column 22, line 22), change "claim 19" to -- claim 21 --.

Signed and Sealed this

Seventh Day of April, 1998

Attest:

BRUCE LEHMAN

Attesting Officer

Commissioner of Patents and Trademarks